United States Patent
Laine et al.

(10) Patent No.: US 9,774,135 B2
(45) Date of Patent: Sep. 26, 2017

(54) ELECTRONIC DEVICE STAND

(71) Applicant: HEWLETT-PACKARD DEVELOPMENT COMPANY, L.P., Houston, TX (US)

(72) Inventors: Aki Laine, Houston, TX (US); Dimitre Mehandjiysky, Houston, TX (US); Michael Delpier, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/035,316

(22) PCT Filed: Dec. 18, 2013

(86) PCT No.: PCT/US2013/075964
§ 371 (c)(1),
(2) Date: May 9, 2016

(87) PCT Pub. No.: WO2015/094209
PCT Pub. Date: Jun. 25, 2015

(65) Prior Publication Data
US 2016/0282905 A1    Sep. 29, 2016

(51) Int. Cl.
| | |
|---|---|
| G06F 1/16 | (2006.01) |
| H01R 13/62 | (2006.01) |
| H02J 50/10 | (2016.01) |
| G06F 1/26 | (2006.01) |
| H02J 7/02 | (2016.01) |
| H01R 13/22 | (2006.01) |

(52) U.S. Cl.
CPC ....... *H01R 13/6205* (2013.01); *G06F 1/1632* (2013.01); *G06F 1/1637* (2013.01); *G06F 1/26* (2013.01); *H01R 13/22* (2013.01); *H02J 7/025* (2013.01); *H02J 50/10* (2016.02)

(58) Field of Classification Search
CPC .................................................... G06F 1/1632
See application file for complete search history.

(56) References Cited

U.S. PATENT DOCUMENTS

| | | | |
|---|---|---|---|
| 7,350,011 | B2 | 3/2008 | Keely et al. |
| 7,715,187 | B2 | 5/2010 | Hotelling et al. |
| 2006/0069837 | A1 | 3/2006 | Zhang et al. |
| 2012/0170212 | A1 | 7/2012 | Gallouzi et al. |
| 2012/0181196 | A1 | 7/2012 | Mongan et al. |
| 2013/0058022 | A1 | 3/2013 | Knutson et al. |
| 2013/0088830 | A1 | 4/2013 | Lim |
| 2013/0107126 | A1 | 5/2013 | Nonomura et al. |
| 2013/0277529 | A1 | 10/2013 | Bolliger |

FOREIGN PATENT DOCUMENTS

TW    M466540    12/2013

Primary Examiner — Anthony Q Edwards
(74) Attorney, Agent, or Firm — HP Patent Department

(57) ABSTRACT

An electronic device stand is provided in accordance with an aspect of the present disclosure. The electronic device stand includes a first section, a second section connected to the first section and positioned at an acute angle to the first section, and a dock connector extending from a first surface of the first section to attach to an electronic device. The first section of the electronic device is to support the electronic device in a first orientation when a first surface of the second section is in a first plane and is to support the electronic device in a second orientation when a second surface of the second section is in the first plane.

15 Claims, 3 Drawing Sheets

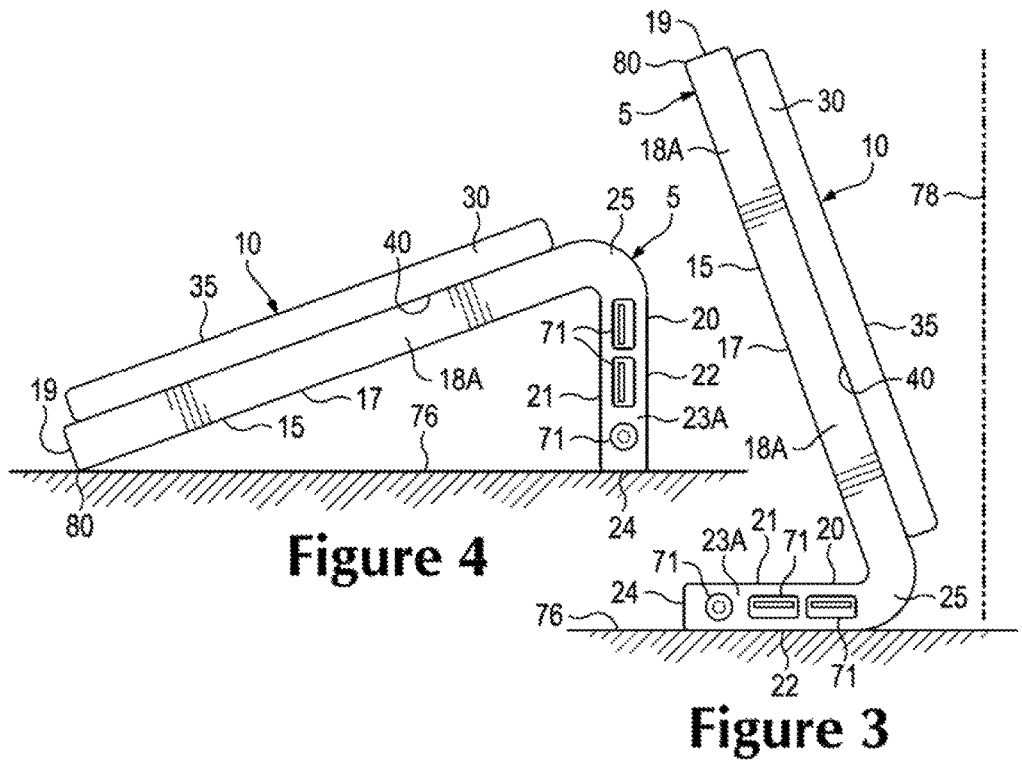
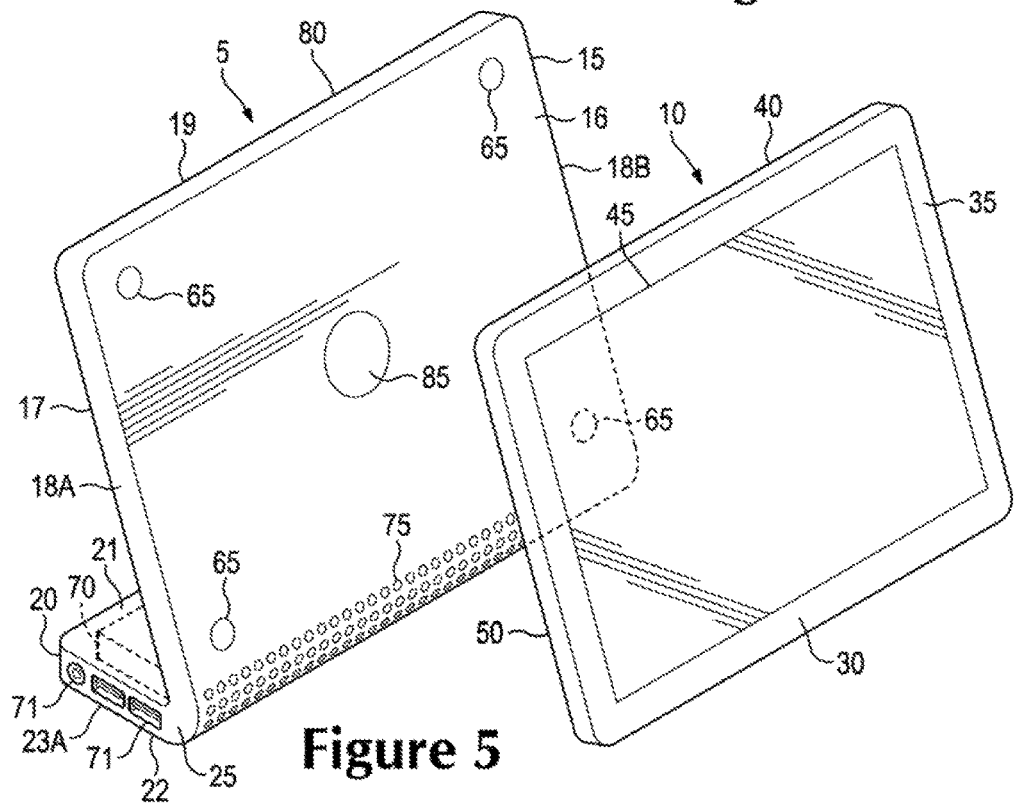

ELECTRONIC DEVICE STAND

BACKGROUND

Increasing number of today's users carry at least one portable electronic device that is equipped with a diverse set of functions. These devices can communicate with each other, reach the Internet, perform different tasks, or access various services through networks. These portable electronic devices have become essential personal accessories, connecting users to friends, work, and entertainment.

BRIEF DESCRIPTION OF THE DRAWINGS

FIG. 3 is a side view of the electronic device stand of FIG. 1 with an attached electronic device positioned in a first orientation according to an example implementation.

FIG. 4 is an alternative side view of the electronic device stand of FIG. 1 with an attached electronic device positioned in a second orientation according to an example implementation.

FIG. 5 is a perspective view of an electronic device stand according to an example implementation.

DETAILED DESCRIPTION

Figure 1:
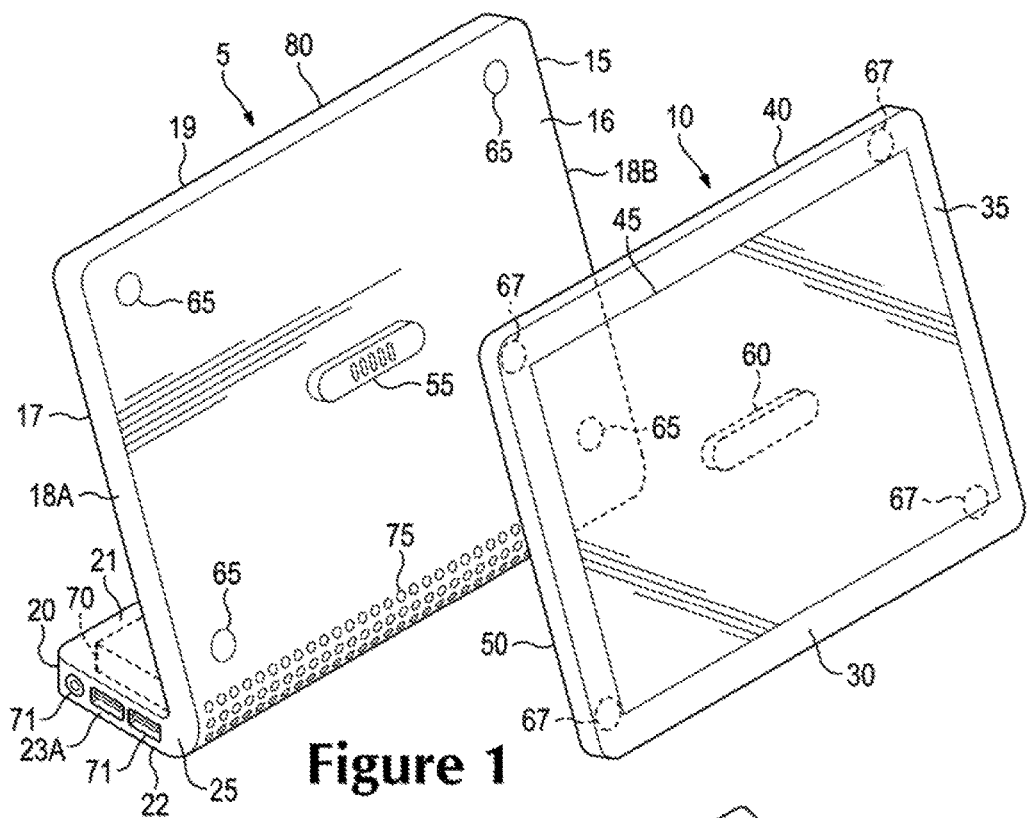
FIG. 1 is a perspective view of an electronic device stand according to an example implementation.

With the recent improvements in technology, portable electronic devices (e.g., tablets, laptops, smartphones, etc.) continue to play an increasing role in people's life. Different users rely on different type of portable electronic devices for many day-to-day activities and work related tasks.

Portable electronic devices come in different sizes, forms, and may include different technical features. Some portable electronic devices are configured as smartphones or tablets and include a touchscreen as their main input interface. Other portable electronic devices are configured as notebooks (e.g., laptops) and include a keyboard portion (i.e. housing) that is attached to a display screen (that may or may not be touch sensitive). In addition, portable electronic devices may also be configured as convertible electronic devices that include a keyboard/battery portion and a display screen portion. When the display screen portion of these devices is docked or attached to the keyboard/battery portion, these devices operate as a laptop and the screen may rotate relative to the keyboard/battery portion. On the other hand, when the display screen portion is not docked (i.e., it is detached from the keyboard/battery portion), these devices operate as handheld devices and a user may rotate their screens between different orientations.

Regardless of the type of portable electronic devices, many of the recently manufactured portable electronic devices (e.g., tablets, smartphones, etc.) include larger and more sophisticated processors, hard drives, and memories as compared to similar older devices. Therefore, these devices now have improved operating capabilities and may be used to perform many functions or tasks that are usually performed with desktop computers. Many users now desire to utilize these efficient portable electronic device as their primary office or home devices. In addition, these devices continue to be heavily used for entertaining (e.g., watching movies, browsing the Internet, etc.). However, since one of the main advantages of these devices is portability and most of the devices have touchscreens, performing many of the complex tasks on these devices with one hand while holding the devices with the other hand may be difficult.

Consequently, in many situations it is desirable to use secondary accessories (e.g., stands, docks, etc.) to support the portable electronic devices while the user is performing certain tasks. To support the electronic devices means that the stands or docks bear all or part of the weight of the electronic device (i.e., they hold up the devices) when the devices are positioned on the stands or docks. It is also desirable that such supporting accessories are easy to use, securely engage the portable electronic devices when the devices attached to them, and also provide enhanced functional capabilities to the attached devices. For instance, a user of the portable electronic devices and such supporting accessories may often want to switch the orientation or the position of the devices (e.g., when he or she is finished watching a movie and wants to do type a paper on the device). However, in many cases, this operation requires one or more of the following: removing the device from the stand, adjusting the position of the stand (e.g., by mechanically moving specific portions of the stand to different positions), rotating the device, and reattaching the device on the stand. Repeating this process many times throughout the day may be cumbersome to the users of such electronic devices.

In addition, there is a tendency that many of the new portable electronic devices are constructed to be very thin. This is due to user's demand for light portable electronic devices that are easy to carry and do not take up too much space. Constructing a thin portable electronic device usually means that the device includes a housing with a very small width (e.g., 0.29-0.40 inches, etc.). One disadvantage of constructing very thin portable electronic devices is that such devices can not include many standard input/output ("I/O") ports (e.g., a High-Definition Multimedia Interface (HDMI) port, a Universal Serial Bus (USB) port, etc.). In addition, most current portable electronic devices have very limited space for speakers due to the small width of the devises. That limits the functionality of the portable electronic devices and makes them less desirable.

The present description is directed to a supporting accessory (i.e., stand, dock, etc.) for an electronic computing device. Specifically, the description proposes a novel and previously unforeseen stand that securely engages a rear portion of an electronic device and supports the device in at least two different viewing orientations without the need to detach the device from the stand in order to transition between the different orientations. The proposed supporting accessory described below further includes various elements (e.g., I/O ports, dock connector, speakers, etc.) that allow the supporting accessory to interact with the attached electronic device and also to provide enhanced connectivity and functional capabilities of the electronic device when the device is attached to the stand.

Therefore, the proposed electronic device stand provides a capability to view and use the attached electronic device on a daily basis in at least two different orientations without the hassle of removing the device from the stand and without the need to mechanically adjust elements of the stand. Further, the proposed stand allows a user to charge the device via the attached dock connector. In addition, the plurality of embedded elements (e.g., ports, speakers, buttons, etc.) of the proposed stand enhance the operating capabilities of the attached electronic device while the device is attached to the stand. Thus, a user may operate the electronic device regularly as their main home or office device.

In an example implementation, an electronic device stand is provided. The electronic device stand includes a first section, a second section connected to the first section and positioned at an acute angle to the first section, and a dock connector extending from a first surface of the first section to attach to an electronic device. The first section of the electronic device is to support the electronic device in a first orientation when a first surface of the second section is in a first plane and is to support the electronic device in a second orientation when a second surface of the second section is in the first plane. In addition, the first surface of the second section and the second surface of the section are substantially perpendicular, and in the second orientation the first section is in contact with the first plane. The stand is to transition the electronic device from the first orientation to the second orientation without removing the electronic device from the stand.

In another example implementation, a system is provided. The system includes an electronic device having a display portion and a base that is opposite to the display portion. The system further includes an electronic device accessory to support the electronic device in at least two orientations. The electronic device accessory includes a first section and a second section connected by a substantially curved third section, at least one port embedded in one of the first section or the second section, at least one speaker positioned in the third section, and a dock connector embedded in the first section to attach to a connector opening at the base of the electronic device.

In yet another example implementation an electronic device stand is provided. The stand Includes a first section to support an electronic device in at least a first orientation and a second orientation, a second section connected to the first section via a third section, and an attachment mechanism positioned on the electronic device stand to attach the electronic device to the electronic device stand. The stand further includes an inductive charging mechanism to communicate with a corresponding inductive charging mechanism in the electronic device when the electronic device is attached to the stand. The stand is to transition the electronic device from the first orientation to the second orientation without removing the electronic device from the stand.

As used herein, the terms "portable electronic device" and "electronic device" may be used interchangeably and refer to any one of various tablets, smartphones, cellular telephones, personal data assistants (PDA's), laptops, computers, and other similar electronic devices that are generally movable and include at least a housing, a display screen, and a processor.

As used herein, the term "dock connector" refers to a connector used to attach an object (e.g., device) to an external resource or device. The dock connector may be a male connector that includes at least one exposed pin or a female connector that includes opening(s) in which the male connector may be inserted. A dock connector carries a variety of signals and power to simplify the process of docking the object and communication between the object and the external resource. A dock connector may be embedded in a mechanical fixture used to support or align a device or may be positioned at the end of a cable.

As used herein, the term "port" refers to any one of various openings that may be included in an electronic device and may include any of I/O or communication ports, multimedia ports, power ports, audio ports or jacks, memory card readers, or any other openings or ports that allow for communication and/or interaction with external devices or objects.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure s defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

With reference to the figures, FIG. 1 is a perspective view of an electronic device stand 5 (also called a dock or a supporting accessory) for a portable electronic device 10 according to an example implementation. The electronic device stand 5 includes a first section 15 and a second section 20 that are connected by a third section 25. The third section 25 connects the first section 15 and the second section 15 such as the second section 20 is positioned at an acute angle to the first section 15. The angle between the second section 20 and the first section may vary depending on the configuration of the stand but, in some examples, the angle is between 100-130 degrees. As explained in additional detail below, the first section 15 is to support the electronic device 10 in at least two orientations that allow a user to view the device 10 and to perform various operations and tasks on the device 10.

The electronic device 10 illustrated in FIG. 1 may be a portable electronic device (e.g., a tablet, etc.) or a convertible electronic device (e.g., a conversable laptop). For example, the electronic device 10 may be a tablet, a laptop, an all in one computing device, a gaming console, a mobile telephone, a music player, a visual player, a personal digital assistant (PDA), an electronic notepad, or any other suitable electronic device that includes at least housing, a display screen, and a processor. In the illustrated example, the electronic device 10 includes a housing 30 having a first side 35 and a second side 40. The first side 35 includes a display 45 and the second side 40 includes a base 50. The display 45 may be substantially rectangular. In another example, the first side 35 may also include additional components (e.g., a keyboard, etc.).

The housing 30 may be constructed from metal, plastic, fiber resin, or another suitable material. The housing 30 may include resistance increasing components (i.e., legs, not shown) on a bottom surface of the base 50 for placing the electronic device on a surface such as a desk or table. The housing 30 may also include components of the electronic device 10 such as a processor, memory, a printed circuit board, battery, or other applicable components (not shown). The display 45 may be an LCD (Liquid Crystal Display), OLED (organic light emitting display) or another type of display. In one example, the display may be a touchscreen display that can be controlled by the user through simple or multi-touch gestures by touching the screen with at least one finger.

Figure 2:
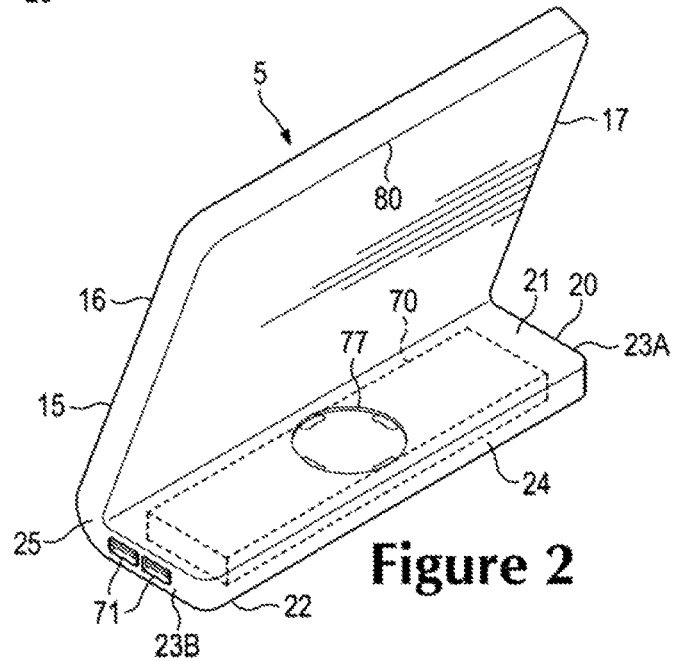
FIG. 2 is an alternative perspective view of the electronic device stand of FIG. 1 according to an example implementation.

The specific details of the proposed electronic device stand 5 are explained in relation to FIGS. 1-4. FIG. 2 is an alternative perspective view of the electronic device 5 according to an example implementation. FIGS. 3 and 4 illustrate alternative side views of the electronic device stand 5 with an attached electronic device 10 positioned two different orientations according to an example implementation.

As shown in FIGS. 1-4, the first section 15 and the second section 20 are substantially planar. In other examples, sections 15 and 20 may have different forms that are sufficient to support the electronic device 10 on the first section 15, to support the stand 5 on the second section 20, and to transition the electronic device 10 from a first orientation to a second orientation without removing the electronic device from the stand. The third section 25 may be substantially curved and connects the first section 15 and the second section 20. The illustrated sections 15, 20, and 25 may be constructed from polished metal, aluminum, plastic, or any other type of suitable material. Sections 15, 20, and 25 may be constructed as one single piece or may be constructed as separate pieces that are later attached to each other.

In one example, the first section 15 may be substantially rectangular but in other implementations it may have different shapes. The first section 15 may have the same shape as the attached electronic device but, in some examples, the first section 15 may be relatively larger than the housing 30 of the device 10. The first section 15 includes a first surface 16, a second surface 17 that may be substantially parallel to the first surface 16, two substantially parallel side surfaces 18A and 18B, and a top surface 19.

In one implementation, the electronic device 10 attaches to the first surface 16 of the first section 15. For instance, a dock connector 55 extends from the first surface 16 of the first section 15 to attach to the electronic device 10. The dock connector may be positioned approximately in the center of the first surface 16. The dock connector 55 may be a male connector that is to engage a corresponding female connector opening 60 positioned at the rear side 40 (e.g., in the base 50) of the electronic device 10 when the electronic device is attached to the stand 5. By attaching the base 50 of the electronic device 10 to the first section 15 of the stand 5, a user may view the display 45 of the device 10 and may operate the device 10 by touching the display 45 or various keys/buttons on the device 10. In one example, the dock connector 55 allows for the device 10 to be attached to the first surface 16 of the dock 5 in two different orientations. For that reason, the dock connector 55 may include a specific configuration of exposed pins (not show) that allow a user to remove the device 10 that is attached in one orientation (e.g., landscape) and reattach the device 10 to the dock connector 55 in a different orientation (e.g., portrait).

The first section 15 of the stand 5 further includes an attachment mechanism for attaching the device 10 to the stand 5. In one example, the attachment mechanism includes a plurality of magnetic members 65 positioned on the first surface 16 of the first section 15. These magnetic members 65 magnetically attach to corresponding members 67 on the electronic device 10. Alternatively, the magnets 48 may directly attach to the surface of a device 10 that does not include any magnets. In another example, the attachment mechanism positioned on the dock 5 includes at least one attachment connector or pin (not shown) extending upwardly from the first surface 16 of the first section 15 to engage at least one opening (not shown) of the electronic device 10. In some implementations, the pins of the attachment mechanism may include a sliding latch (not shown) to slide into the corresponding openings of the device 10 and to engage a latch hook (not shown) for secured attachment of the electronic device 10 to the electronic device stand 5. Further, the pins may also include at least one polar magnet (not shown) to attach to an opposite polar magnet positioned at the corresponding openings of the device 10.

In other examples, the electronic device stand 5 may include other types of attachment mechanisms to directly attach/detach the device 10 to the stand 5. Such mechanisms may include magnets (not shown) positioned in the dock connector 55 to engage to corresponding magnets at the connector opening 60 on the rear end of the device 10. Other attachment mechanisms may include fasteners, clips, straps, hoops, or any other mechanism or combination of mechanisms that allows for a secure attachment of the electronic device 10 to the stand 5. Regardless of the type of attachment mechanism that is used, there is always a strong mechanical connection between the electronic device 10 and the stand. This connection provides secure attachment of the electronic device 10 to the electronic device stand 5 and thus allows a user to change the orientation of the device without removing the device from the stand. The attachment mechanism may further include a release mechanism (not shown) to release the attachment between the elements of the attachment mechanism and the electronic device 10. For example, the release mechanism may be positioned on any of the section 15, 20, and 25 of the stand 5. The release mechanism may be a sliding mechanism, a push button, an electronic cylinoid, or any other type of release mechanism that is designed to disengage the electronic device 10 from the electronic device stand 5.

The second section 20 of the stand is substantially rectangular but in other implementations it may have different shapes. The second section 20 includes a top surface 21, a bottom surface 22 that may be parallel to the top surface 21, two substantially parallel side surfaces 23A and 23B, and a third side surface 24. The bottom surface 22 may be substantially planar and may be used to support the stand 5 when the stand is in a first orientation. The second section may also include a battery 70 that is to provide power to the stand 5 and the device 10 when the stand 5 is not connected to an external power source.

The second section 20 includes at least one port 71 embedded in the second section 20. For example the second section 20 includes three ports 71 positioned on the first side surface 23A and two ports 71 positioned on the second side surface 23B. Alternatively, ports may also be positioned on different portions of the second section 20 (e.g., on the third side surface 24, on the top surface 21, etc.), or on sections 15 and 25 of the stand 5. In one example, the at least one port 71 may be embedded in at least one of the substantially parallel side surfaces 18A and 18B of the first section 25. The ports 71 may be positioned in such a way that they are accessible to user regardless of the position of the stand 5 and the orientation of the device 10. In other words, the ports 71 may be accessible in either the first or the second orientation of the device 10.

The ports 71 may include any type of a port or an opening that allows for communication and/or interaction with external devices or objects. For example, the ports 71 may include an HDMI port (e.g., full size HDMI, mini HDMI, micro HDMI etc.), a USB port (e.g., full size USB, mini USB, micro USB, power USB), a Thunderbolt port, a memory card reader slot, a DC power jack, a RJ-45 port, an audio jack or port (e.g., for headphone, microphones, etc.) or any other type of port. The electronic device stand 5 may also include various buttons or keys (e.g., power, volume, etc.), as well as different displays or indicators (e.g., to indicate charging, low battery, etc.). The support stand 5 may further include connecting elements (e.g., the dock connector 55) as well as electronic elements or circuits (not shown) that can facilitate the interaction between the stand 5 and the electronic device 10.

The at least one port 71 provides enhanced connectivity of the electronic device 10 when the device is attached to the stand 5. For example, the electronic device may receive power through one of the ports 71 and a user may power charge the electronic device 10 without removing the device 10 from the stand 5. In addition, the combination between ports 71 and the dock connector 55 allows for a full spectrum of connection and communication capabilities between the device 10 and a variety of external accessories (e.g., a screen, a speaker, a mouse, etc.).

The third section 25 may be substantially curved and may connect the first section 15 and the second section 20. The third section 25 includes at least one speaker 75 positioned substantially across the length of the third section 25. In some examples, portions of the speaker 75 may also be positioned in the first section 15 and the second section 20. Because of the substantially curved shape of the third section 25, the speaker 75 always has an unobstructed view regardless of the position of the stand 5. In some implementations, the third section 25 may be flexibly connected to sections 15 and 20 (e.g., via flexible mechanisms, mechanical connections, etc.; not shown) such that the position of the first section 15 and the second section 20 may be adjusted in relation to the third section 25. For example, when the stand is a in a first orientation (e.g., FIG. 1), the user may adjust the position of the first section 15 (and consequently the angle between the first section 15 and the second section 25) by gripping the first section 15 moving it downwards or upwards to a desired position. The second section may be adjusted in a similar way when the stand 5 is in a different position (e.g., FIG. 4).

The stand 5 may also include a subwoofer 77 positioned on the on the top surface 21 of the second section 20. In alternative examples, the subwoofer 77 may be positioned in different sections of the stand 5. Many of the recently manufactured electronic devices 10 include speakers that are located in the rear side 40 (e.g. In the base 50) of the device 10. Thus, when the device 10 is positioned on a dock, the speakers are covered by a portion of the dock and may not perform according to their full capacity. The speaker 75 of the dock 5 offers a solution that allows a user of the device 10 to always have a strong sound regardless of the position of the dock 5 and the tablet 10.

The configuration of the stand 5 allows positioning the device 5 on the stand 5 in at least two orientations. The first orientation of the device 10 may be a media mode (shown in FIG. 3), where the device 10 is at such a position that allows a user to view content displayed on the device 10 in a landscape view. In that situation, the user may not need to directly interact with the device too often (e.g., when the user is watching a movie). In that example, the first section 15 of the stand 5 supports the electronic device 10 in the first orientation and the bottom surface 22 of the second section 20 is in a first plane. In some examples, the bottom surface 22 of the second section 20 may rest on an external surface (e.g., table, desk, etc.) to support the stand 5. In the first orientation, the first section 15 of the stand 5 may be positioned at an angle of 100-130 degrees in relation to a horizontal plane 76 (e.g., a desk, etc.). In other words, the device 10 attached to the stand 5 may be positioned at an angle of 15-30 degrees in relation to a vertical plane 78 extending from a horizontal surface. In some examples, the plane 76 and the first plane of the bottom surface 22 when the device is in the first orientation may be the same. It is to be understood that the angles listed above are only used as an example and that the first section 15 may be positioned at any desirable angle to support a specific orientation of the electronic device 10.

In some examples, the second orientation of the device 10 may be a touch mode (shown in FIG. 4), where the device 10 is at such a position that allows a user to continually interact with the device 10 (e.g., via the display 45). In that orientation, a user may perform various tasks or functions (e.g., typing, data entry, image editing, etc.) when the device 10 is attached to the stand 5. In that example, the first section 15 (i.e., the first surface 16) of the stand 5 supports the electronic device 10 in the second orientation and the third side surface 24 of the second section 20 is in the first plane (i.e., the same plane as the bottom surface 22 of the second section 20 when the device is the first orientation). Thus, the bottom surface 22 and the third side surface 24 of the second section 20 may be substantially perpendicular. In some examples, the third side surface 24 of the second section 20 may rest on an external surface (e.g., table, desk, etc.). In the second orientation, the first section 15 of the stand 5 may be positioned at an angle of 15-30 degrees in relation to the horizontal plane 76 (e.g., a desk, etc.). It is to be understood that the angles listed above are only used as an example and that the first section 15 may be positioned at any desirable angle to support a specific orientation of the electronic device 10.

Due to the configuration of the stand 5 and the secured attachment of the device 10 to the stand 5, the stand may transition the electronic device 10 from the first orientation (i.e., media mode) to the second orientation (i.e., touch mode) without removing the electronic device 10 from the stand 5. Thus, in order to change the orientation of the device 10, a user may simply move and reposition the stand 5. When the device is in the first orientation, the user may grip the first section 15 of the stand 5 and move it downwards until the first section 15 (i.e., the top surface 19) is in contact with the first plane (i.e., the same plane as the bottom surface 22 when the device 10 is the first orientation, and as the third side surface 24 when the device 10 is in second orientation). In that situation, at least an edge 80 of the top surface 19 may contact the first plane. That operation also changes the position of the second section 20, such as the third side surface 24 is in the first plane. For example, the stand may at least partially rest on the third side surface 24. Since most current electronic devices include sensors, accelerometers, or other components for automatically changing the orientation of the screen 45, changing the position of the stand 5 should not affect the content displayed on the screen 45 of the device.

Thus, a user may view and use the electronic device 10 attached to the stand 5 in at least two different orientations without removing the device from the stand 5 and without the hassle of mechanically adjusting elements of the stand. Further, the plurality of embedded elements (e.g., ports, speakers, etc.) of the proposed stand 5 enhance the operating capabilities of the electronic device 10 when the device is attached to the stand. Thus, users may operate the electronic device 10 as their main device.

FIG. 5 is a perspective view of the electronic device stand 5 and an electronic device 10 to be attached to the electronic device stand 5 according to an example implementation. The electronic device stand 5 illustrated in FIG. 5 includes many of the same elements as the electronic device stand 5 shown in FIGS. 1-4. The electronic device stand 5 of FIG. 5 includes the first section 15 that supports the device 10 in at least the first orientation, the second section 20 that is connected to the first section via the third section 25, and an attachment mechanism positioned on the electronic device stand 5 to attach the electronic device 10 to the stand 5. In addition, the electronic device stand 5 of FIG. 5 includes an Inductive charging mechanism (not shown) to communicate with a corresponding inductive charging mechanism (not shown) in the electronic device 10 when the electronic device is attached to the stand. For example, the stand 5 includes a primary coil (not shown) that induces a current in the secondary coil (not shown) positioned in the device 10 or a case/cover attached to the device 10. Thus, when the device 10 is attached to the stand 5, a user may power charge the electronic device 10 through the inductive charging mechanism without removing the device 10 from the stand 5.

Therefore, in the configuration shown in FIG. 5, the proposed stand 5 may not include a dock connector. In that configuration, the stand 5 may also include a wireless interface (e.g., Bluetooth, near field communication, etc.) to enable communication between the stand 5 and the electronic device 10. In addition to the magnetic members 65 positioned on the first surface 16 of the first section 15, the attachment mechanism may also include a larger magnetic member 85 positioned in the center of the first surface 16. The magnetic member 85 may attach to a portion of the device 10 or to an external case of the device 10.

Figure 6:
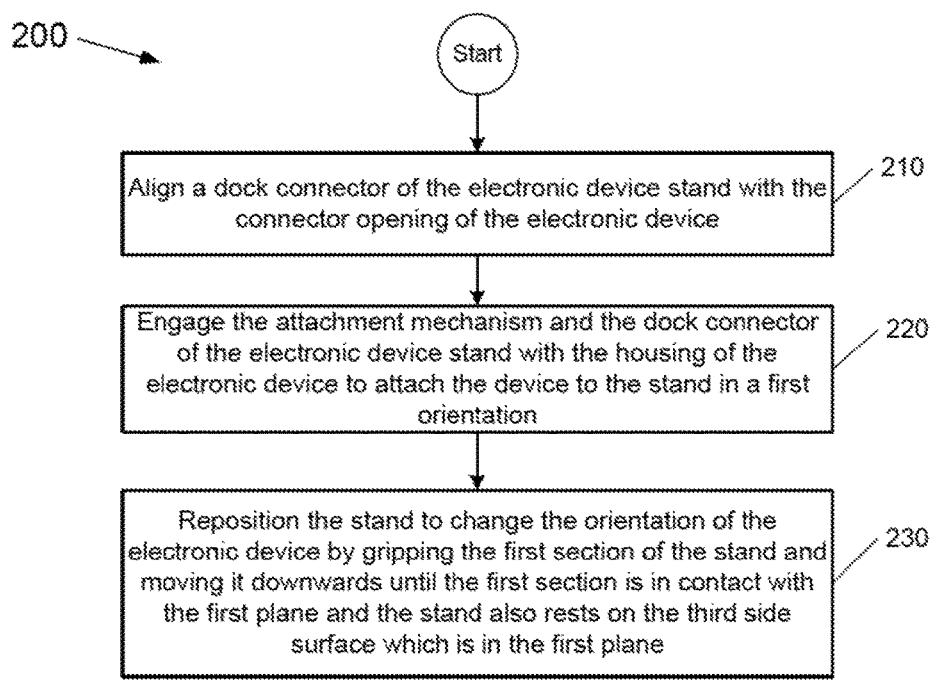
FIG. 6 is a flow chart of a method of operating an electronic device and an electronic device stand according to an example implementation.

FIG. 6 is a flow chart of a method 200 operating a system including the electronic device 10 and the electronic device stand 5 according to an example implementation. The method 200 may be practiced with the electronic device stand 5 of FIGS. 1-5 and with any type of electronic device 10.

The method 200 aligns the dock connector 55 of the electronic device stand 5 with the connector opening 60 of the electronic device 10 (at 210). At 220, the attachment mechanism (e.g., pins, magnets, etc.) of the stand 5 engages the housing 55 of the electronic device 10 to securely attach the device 10 to the stand 5 in a first orientation (e.g., media mode). In addition (at 220), the dock connector 55 engages with the connector opening 60 in the housing 55 of the device 10. When the user desires to change the orientation of the electronic device, the method 200 allows the user to reposition that stand 5 by gripping the first section 15 of the stand 5 and moving it downwards until the top surface 19 of the first section 15 is in contact with the first plane. In that scenario, at least the edge 80 of the top surface 19 may be in contact with the first plane and the stand also rests on the third side surface 24 which is in the first plane (at 230). The method 200 allows a user to operate the electronic device 10 attached to the stand 5 in at least two different orientations without removing the device from the stand 5 and without the making any mechanical adjusting to the stand.

What is claimed is:

1. An electronic device stand, comprising:
   a first section;
   a second section connected to the first section and positioned at an acute angle to the first section; and
   a dock connector extending from a first surface of the first section to attach to an electronic device,
   wherein the first section is to support the electronic device in a first orientation when a first surface of the second section is in a first plane and is to support the electronic device in a second orientation when a second surface of the second section is in the first plane.

2. The electronic device stand of claim 1, wherein the first surface of the second section and the second surface of the second section are substantially perpendicular, and wherein the stand is to transition the electronic device from the first orientation to the second orientation without removing the electronic device from the stand.

3. The electronic device stand of claim 1, wherein in the second orientation the first section is in contact with the first plane.

4. The electronic device stand of claim 1, further comprising at least one port embedded in at least one side surface of the first section or the second section, wherein the at least one port is accessible in either orientation of the electronic device.

5. The electronic device stand of claim 1, wherein the dock connector is to engage a connector opening at a rear portion of the electronic device when the electronic device is attached to the stand.

6. The electronic device stand of claim 1, further comprising a substantially curved third section connecting the first section and a second section, the third section including at least one speaker.

7. The electronic device stand of claim 6, wherein the third section is flexibly connected to the first section and the second section such that the position of the first section and the second section may be adjusted in relation to the third section.

8. A system comprising:
   an electronic device including a display portion and a base that is opposite to the display portion; and
   an electronic device accessory to support the electronic device in at least two orientations, the electronic device accessory comprising:
      a first section and a second section connected by a substantially curved third section,
      at least one port embedded in one of the first section or the second section,
      at least one speaker positioned in the third section, and
      a dock connector embedded in the first section to attach to a connector opening at the base of the electronic device.

9. The system of claim 8, further comprising an attachment mechanism positioned on the electronic device accessory to connect the electronic device to the electronic device accessory.

10. The system of claim 8, wherein the first section is to support the electronic device in a first orientation where a first surface of the second section is in a first plane, and wherein the accessory is to transition the electronic device to a second orientation where a second surface of the second section is in the first plane.

11. The system of claim 10, wherein the first surface of the second section and the second surface of the second section are substantially perpendicular, and wherein in the second orientation the first section is in contact with the first plane.

12. An electronic device dock, comprising:
   a first section to support an electronic device in at least a first orientation and a second orientation;
   a second section connected to the first section via a third section;
   an attachment mechanism positioned on the electronic device dock to attach the electronic device to the electronic device dock; and
   an inductive charging mechanism to communicate with a corresponding inductive charging mechanism in the electronic device when the electronic device is attached to the dock, wherein the dock is to transition the electronic device from the first orientation to the second orientation without removing the electronic device from the dock.

13. The electronic device dock of claim 12, further comprising at least one port embedded in at least one side surface of the first section or the second section, wherein the at least one port is accessible in the first orientation and the second orientation of the electronic device.

14. The electronic device dock of claim 12, further comprising least one speaker positioned across a length of the third section.

15. The electronic device dock of claim 12, further comprising a wireless interface to enable communication between the stand and the electronic device.

* * * * *